United States Patent
Dong et al.

(10) Patent No.: US 11,606,148 B2
(45) Date of Patent: Mar. 14, 2023

(54) POLARIZATION PROCESSING APPARATUS, OPTICAL TRANSCEIVER, AND OPTICAL POLARIZATION PROCESSING METHOD

(71) Applicant: HUAWEI TECHNOLOGIES CO., LTD., Guangdong (CN)

(72) Inventors: Zhen Dong, Dongguan (CN); Yanbo Li, Dongguan (CN); Xiaolu Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/325,763

(22) Filed: May 20, 2021

(65) Prior Publication Data

US 2021/0273727 A1     Sep. 2, 2021

Related U.S. Application Data

(63) Continuation of application No. PCT/CN2018/117334, filed on Nov. 24, 2018.

(51) Int. Cl.
     *H04B 10/61*            (2013.01)
     *H04B 10/40*            (2013.01)
     (Continued)

(52) U.S. Cl.
     CPC ............. *H04B 10/516* (2013.01); *G02B 6/27* (2013.01); *H04B 10/25* (2013.01); *H04B 10/40* (2013.01);
     (Continued)

(58) Field of Classification Search
None
See application file for complete search history.

(56) References Cited

U.S. PATENT DOCUMENTS 6,211,996 B1 *   4/2001   Fuse ................... H03C 7/00
                                              359/278
7,817,923 B2 * 10/2010   Akiyama ......... H04B 10/50577
                                              398/183
(Continued)

FOREIGN PATENT DOCUMENTS

CN        101765796 A       6/2010
CN        103558660 A       2/2014
(Continued)

OTHER PUBLICATIONS

Office Action issued in Chinese Application No. 201880099370.1 dated Nov. 3, 2021, 11 pages.
(Continued)

*Primary Examiner* — Li Liu
(74) *Attorney, Agent, or Firm* — Fish & Richardson P.C.

(57) ABSTRACT

Example polarization processing optical devices, methods, and systems are disclosed. A polarization processing optical device includes a polarization beam splitter (PBS), a polarization rotator (PR), a coupler, and a phase tuner (PT), where one port of the PBS is configured to input a continuous light source, and the other two ports of the PBS are respectively connected to the PR and one port of the coupler, the PR is connected to another port of the coupler, the PT is disposed on a connection between the PBS and the coupler or a connection between the PR and the coupler, at least one port of the coupler is configured to output single-polarization light, and the PT is configured to control output optical power of the coupler.

6 Claims, 12 Drawing Sheets

(51) Int. Cl.
  *H04B 10/516* (2013.01)
  *G02B 6/27* (2006.01)
  *H04B 10/25* (2013.01)
  *H04B 10/50* (2013.01)
  *H04B 10/63* (2013.01)

(52) U.S. Cl.
  CPC ......... *H04B 10/503* (2013.01); *H04B 10/614* (2013.01); *H04B 10/615* (2013.01); *H04B 10/63* (2013.01)

(56) References Cited

U.S. PATENT DOCUMENTS

| | | | | |
|---|---|---|---|---|
| 7,826,752 | B1* | 11/2010 | Zanoni | H04B 10/677 398/186 |
| 9,784,921 | B1* | 10/2017 | Zhang | G02B 6/355 |
| 9,853,737 | B2* | 12/2017 | Rasmussen | H04B 10/541 |
| 10,128,956 | B2* | 11/2018 | Griffin | H04B 10/50572 |
| 10,547,408 | B2* | 1/2020 | He | H04B 10/5053 |
| 10,805,009 | B2* | 10/2020 | Hayashi | G02F 1/225 |
| 10,845,668 | B2* | 11/2020 | Ogiso | H04B 10/548 |
| 2003/0210860 | A1* | 11/2003 | Margalit | H04J 14/021 385/27 |
| 2003/0219188 | A1* | 11/2003 | Doi | G02F 1/225 385/11 |
| 2004/0067022 | A1* | 4/2004 | Chen | G02B 6/1221 385/42 |
| 2004/0101227 | A1* | 5/2004 | Takabayashi | G02F 1/0136 385/11 |
| 2004/0141691 | A1* | 7/2004 | Wiesmann | G02F 1/3136 385/39 |
| 2005/0058386 | A1* | 3/2005 | Little | G02F 1/3136 385/11 |
| 2005/0069242 | A1* | 3/2005 | Fujita | G02F 1/0955 385/11 |
| 2005/0185970 | A1* | 8/2005 | Madsen | H04B 10/2569 398/202 |
| 2007/0086017 | A1* | 4/2007 | Buckland | G01N 21/45 356/497 |
| 2008/0080872 | A1* | 4/2008 | Tanaka | H04B 10/50575 398/16 |
| 2010/0080571 | A1* | 4/2010 | Akiyama | H04B 10/54 398/186 |
| 2010/0202724 | A1* | 8/2010 | Little | G02B 6/2773 385/5 |
| 2010/0239260 | A1* | 9/2010 | Oikawa | H04J 14/0224 398/81 |
| 2011/0243556 | A1* | 10/2011 | Nagarajan | H04J 14/02 398/43 |
| 2012/0170938 | A1* | 7/2012 | Evans | H04B 10/40 398/91 |
| 2012/0207475 | A1* | 8/2012 | Tian | H04B 10/671 398/65 |
| 2012/0213511 | A1* | 8/2012 | Xiao | H04J 14/06 398/25 |
| 2013/0155482 | A1* | 6/2013 | Toya | G02F 1/0123 359/279 |
| 2014/0037286 | A1* | 2/2014 | Krasulick | H04B 10/07955 398/38 |
| 2014/0126913 | A1* | 5/2014 | Nakamoto | H04B 10/541 398/115 |
| 2015/0117872 | A1* | 4/2015 | Lyubomirsky | H04J 14/02 398/205 |
| 2015/0236792 | A1* | 8/2015 | Sugihara | G02F 1/0123 398/183 |
| 2015/0270905 | A1* | 9/2015 | Rasmussen | H04B 10/541 398/186 |
| 2015/0341121 | A1* | 11/2015 | Yue | H04B 10/532 398/184 |
| 2016/0007105 | A1* | 1/2016 | Jeong | H04Q 11/0005 398/48 |
| 2016/0261352 | A1* | 9/2016 | Wen | H04B 10/5053 |
| 2016/0313505 | A1* | 10/2016 | Ma | G02B 6/2726 |
| 2016/0323039 | A1* | 11/2016 | Sun | H04J 14/026 |
| 2017/0163000 | A1* | 6/2017 | Evans | H01S 5/142 |
| 2018/0076901 | A1* | 3/2018 | Yue | H04B 10/5053 |
| 2018/0284350 | A1* | 10/2018 | Ayliffe | G02B 6/4213 |
| 2018/0292607 | A1* | 10/2018 | Dong | G02B 6/43 |
| 2019/0199443 | A1* | 6/2019 | Zamani | H04B 10/616 |
| 2019/0229812 | A1* | 7/2019 | Shtaif | H04J 14/06 |
| 2020/0099449 | A1* | 3/2020 | Way | H04B 10/40 |
| 2020/0137468 | A1* | 4/2020 | Schimpe | H04B 10/27 |
| 2020/0280172 | A1* | 9/2020 | Zhao | H01S 5/06821 |

FOREIGN PATENT DOCUMENTS

| | | |
|---|---|---|
| CN | 104459881 A | 3/2015 |
| CN | 105308495 A | 2/2016 |
| CN | 107407828 A | 11/2017 |
| CN | 105676483 A | 7/2018 |
| CN | 108398747 A | 8/2018 |
| WO | 2016138860 A1 | 9/2016 |

OTHER PUBLICATIONS

PCT International Search Report and Written Opinion issued in International Application No. dated Aug. 14, 2019, 16 pages (with English translation).

Extended European Search Report issued in European Application No. 18941010.3 dated Oct. 6, 2021, 8 pages.

Office Action issued in Chinese Application No. 201880099370.1 dated Apr. 26, 2022, 4 pages.

* cited by examiner

POLARIZATION PROCESSING APPARATUS, OPTICAL TRANSCEIVER, AND OPTICAL POLARIZATION PROCESSING METHOD

CROSS-REFERENCE TO RELATED APPLICATIONS

This application is a continuation of International Application No. PCT/CN2018/117334, filed on Nov. 24, 2018. The disclosure of which is hereby incorporated by reference in its entirety.

TECHNICAL FIELD

This application relates to the field of optical devices, and in particular, to a polarization processing apparatus, an optical transmitter, an optical receiver, and an optical polarization processing method.

BACKGROUND

A continuous increase in an optical interconnection capacity is accompanied by a new form of optical module, namely, an intra-board optical module, for example, an on-board optical module, co-packaged optics, or an optical microprocessor. The intra-board optical module has advantages of high density, low costs, and the like. However, because it is inconvenient to replace the intra-board optical module, failure rate of the intra-board optical module is an important indicator. In the optical module, a light source has the highest failure rate. Therefore, a centralized light source pool is considered in the industry. To be specific, light sources are taken out from the optical module and placed together, and are connected to a modulation unit of the optical module by using an optical fiber, and then 1:N optical splitting application is used (in other words, one high-power light source supports a plurality of modulators).

Modulation units in the optical module are generally polarization sensitive components, and usually need to work in a case of polarized light in a transverse electric (TE) mode. Therefore, the light source pool and the modulation unit need to be connected by using a polarization maintaining optical fiber array. The polarization maintaining optical fiber array is expensive, causing a large increase in costs of the entire solution.

SUMMARY

Embodiments of this application provide a polarization processing apparatus, method, and system, to reduce costs.

According to a first aspect, an embodiment of this application provides a polarization processing optical device. The optical device includes a polarization beam splitter (PBS), a polarization rotator (PR), a first coupler, and a phase tuner (PT);

one of three ports of the PBS is configured to input a continuous light source, and the other two of the three ports of the PBS are respectively connected to one port of the PR and a first port of the first coupler;

the other port of the PR is connected to a second port of the first coupler;

the PT is disposed on a connection between the PBS and the first coupler, or the PT is disposed on a connection between the PR and the first coupler; and a third port and a fourth port of the first coupler are configured to output single-polarization light in a same polarization state, and the PT is configured to control output optical power of the third port and the fourth port to be equal.

It should be noted that equal optical power may be strictly equal optical power or approximately equal optical power.

In a first possible implementation of the first aspect, the optical device further includes two modulators and two drivers; the third port and the fourth port of the first coupler are connected to the two modulators through a one-to-one correspondence; the two drivers are connected to the two modulators through a one-to-one correspondence; and each of the two modulators includes one optical signal output port. This design can provide dual-channel optical signal output.

Specifically, the modulator is any one of a Mach-Zehnder modulator (MZM), an electro-absorption modulator (EAM), and a microring modulator (MRM).

Specifically, the first coupler may be a 2*2 coupler.

Optically, in the first possible implementation, the optical device further includes two photodetectors (PD), and the two PDs are connected to the third port and the fourth port of the first coupler through a one-to-one correspondence, or the two PDs are connected to optical signal output ports of the two modulators through a one-to-one correspondence. Alternatively, the optical device further includes one PD, and the PD is connected to either of the third port and the fourth port of the first coupler, or the PD is connected to either of optical signal output ports of the two modulators.

In a second possible implementation of the first aspect, the optical device further includes a second coupler, a third coupler, 2N modulators, and 2N drivers, the optical device includes 2N optical signal output ports, and N is a positive integer greater than or equal to 2; each of the second coupler and the third coupler includes one input port and N output ports; the third port and the fourth port of the first coupler are connected to an input port of the second coupler and an input port of the third coupler through a one-to-one correspondence; the 2N modulators are connected to N output ports of the third coupler and N output ports of the second coupler through a one-to-one correspondence; the 2N drivers are connected to the 2N modulators through a one-to-one correspondence; and each of the 2N modulators includes one optical signal output port. This design can provide multi-channel optical signal output.

Specifically, either of the second coupler and the third coupler includes (N−1) 1*2 couplers.

Optionally, in the second possible implementation of the first aspect, the optical device further includes two PDs, and the two PDs are connected to the third port and the fourth port of the first coupler through a one-to-one correspondence, or the two PDs are connected to output ports of the two modulators through a one-to-one correspondence, or the two PDs are connected to the second coupler and the third coupler through a one-to-one correspondence. Alternatively, the optical device further includes one PD, and the PD is connected to either of the third port and the fourth port of the first coupler, or the PD is connected to either of output ports of the two modulators, or the PD is connected to either of the second coupler and the third coupler.

In a third possible implementation of the first aspect, the optical device further includes a second coupler, another PT, a radio frequency electrode, and a driver; the third port and the fourth port of the first coupler are respectively connected to two ports of the second coupler, to obtain two connections; the another PT is placed on either of the two connections, and the another PT is configured to control a phase of light passing through the another PT, so that there is a preset proportion of optical power output by the second coupler to peak power; the radio frequency electrode is placed on at least one of the two connections of the first coupler and the second coupler; the driver is configured to drive the radio frequency electrode; and the second coupler includes one optical signal output port. This design can implement single-channel optical signal output.

Specifically, the preset proportion may be half of the peak power.

In a possible design of the third possible implementation of the first aspect, there is one radio frequency electrode, and the driver is configured to drive the radio frequency electrode; or there are two radio frequency electrodes, and the driver is configured to drive either of the two radio frequency electrodes or differentially drive the two radio frequency electrodes.

Optionally, in the third possible implementation of the first aspect, the optical device further includes two PDs, and the two PDs are connected to the third port and the fourth port of the first coupler through a one-to-one correspondence.

Specifically, the second coupler is a 2*1 coupler; or the second coupler is a 2*2 coupler.

In a fourth possible implementation of the first aspect, the optical device further includes a second coupler, a third coupler, a fourth coupler, a fifth coupler, four modulators, four drivers, another PT, still another PT, another PR, and another PBS;

the third port and the fourth port of the first coupler are connected to one port of the second coupler and one port of the third coupler through a one-to-one correspondence, and the other two ports of the second coupler and the other two ports of the third coupler are connected to the four modulators through a one-to-one correspondence;

the four drivers are connected to the four modulators through a one-to-one correspondence;

output ports of two modulators connected to the second coupler in the four modulators are both connected to one port of the fourth coupler, and output ports of two modulators connected to the third coupler in the four modulators are both connected to one port of the fifth coupler;

either of the fourth coupler and the fifth coupler is connected to the another PBS, the other one of the fourth coupler and the fifth coupler is connected to the PR, and the PR is connected to the another PBS;

the another PT is disposed on either of connections between the output ports of the two modulators connected to the second coupler in the four modulators and one port of the fourth coupler;

the still another PT is disposed on either of connections between the output ports of the two modulators connected to the third coupler in the four modulators and one port of the fifth coupler; and the PBS includes one optical signal output port.

This design can provide coherent optical signal output.

Optionally, in the fourth possible implementation of the first aspect, the optical device further includes two PDs, and the two PDs are connected to the third port and the fourth port of the first coupler through a one-to-one correspondence, or the two PDs are connected to either of the other two ports of the second coupler and either of the other two ports of the third coupler through a one-to-one correspondence.

Specifically, the optical device in any one of the foregoing implementations is a photonic integrated chip (PIC), and the PIC is a silicon photonic integrated chip, a gallium arsenide integrated chip, an indium phosphide integrated chip, a lithium niobate integrated chip, or the like.

According to a second aspect, an embodiment of this application provides a polarization processing apparatus. The polarization processing apparatus includes a controller and the optical device according to any one of the first aspect, the implementations of the first aspect, and specific implementation of the implementations, the controller is connected to the optical device, and the controller is configured to control a phase of the PT.

According to a third aspect, an embodiment of this application provides an optical transmitter. The optical transmitter includes a light source, a conventional optical fiber, and the optical device according to any one of the first aspect, the implementations of the first aspect, and specific implementation of the implementations. The light source is connected to one end of the conventional optical fiber, and the other end of the conventional optical fiber is connected to a port that is in three ports of the PBS and that is configured to input a continuous light source.

According to a fourth aspect, an embodiment of this application provides an optical transmitter. The optical transmitter includes a light source pool, N conventional optical fibers, and N optical devices according to any one of the first aspect, the implementations of the first aspect, and specific implementation of the implementations. The light source pool includes N light sources, and N is a positive integer greater than or equal to 2. The N light sources in the light source pool are connected to one end of the N conventional optical fibers through a one-to-one correspondence, and the other end of the N conventional optical fibers is connected, through a one-to-one correspondence, to ports that are of PBSs of the N optical devices and that are configured to input a continuous light source.

According to a fifth aspect, an embodiment of this application provides an optical receiver. The optical receiver includes a polarization processing apparatus, a multiplexer, and a coherent receiver, the multiplexer is connected to the polarization processing apparatus, the polarization processing apparatus is connected to the coherent receiver, the multiplexer is configured to receive a local oscillator optical energy sent by another device, the polarization processing apparatus is configured to process the local oscillator optical energy output by the multiplexer into single-polarization light, the coherent receiver is configured to receive the single-polarization light for coherent reception processing, and the polarization processing apparatus includes a PBS, a PR, a first coupler, and a PT. The PBS includes three ports, one of the three ports is configured to connect to the multiplexer, and the other two of the three ports are respectively connected to one port of the PR and a first port of the first coupler. The other port of the PR is connected to a second port of the first coupler. The PT is disposed on a connection between the PBS and the first coupler, or the PT is disposed on a connection between the PR and the first coupler.

A third port of the first coupler is configured to output single-polarization light, the third port is connected to an input port of the coherent receiver, and the PT is configured to control output optical power of the third port to be half of peak power.

Optionally, the optical receiver further includes an optical amplifier, and the polarization processing apparatus is connected to the optical receiver by using the optical amplifier.

According to a sixth aspect, an embodiment of this application further provides a polarization processing method. The method includes:

receiving a first optical energy, where the optical energy is a continuous optical energy in a mixed polarization state;

performing polarization state separation on the first optical energy to obtain a second optical energy and a third optical energy, where the second optical energy is in a first mode, and the third optical energy is in a second mode;

performing mode rotation on the third optical energy to obtain a fourth optical energy, where a mode of the fourth optical energy is the same as that of the second optical energy; and after phase adjustment is performed on either of the second optical energy and the fourth optical energy, inputting one of the second optical energy and the fourth optical energy on which no phase adjustment is performed and the other into a coupler to implement multimode interference, to obtain a sixth optical energy and a fifth optical energy, where optical power of the sixth optical energy is equal to that of the fifth optical energy.

The first mode and the second mode may be TE and TM respectively or may be TM and TE respectively.

Optionally, any one of the following processing may be further performed on the output sixth optical energy and the output fifth optical energy:

separately performing signal modulation on the sixth optical energy and the fifth optical energy to implement multi-channel optical signal output;

further dividing the sixth optical energy and the fifth optical energy into 2N optical energies (where N is greater than or equal to 2), and then performing signal modulation to implement optical signal output of four or more channels;

performing combination and signal modulation on the sixth optical energy and the fifth optical energy to implement single-channel optical signal output;

combining the sixth optical signal and the fifth optical signal to implement single-channel single-polarization-state optical energy output; and using only one of the sixth optical signal and the fifth optical signal to implement single-channel single-polarization-state optical energy output.

According to the polarization processing apparatus disclosed in this application, the optical transmitter and/or receiver may connect a light source and an optical modulator by using a conventional optical fiber, so that costs of the transmitter and/or the receiver are greatly reduced.

BRIEF DESCRIPTION OF DRAWINGS

The following further describes the embodiments of this application with reference to accompanying drawings in detail.

DESCRIPTION OF EMBODIMENTS

Figure 1:
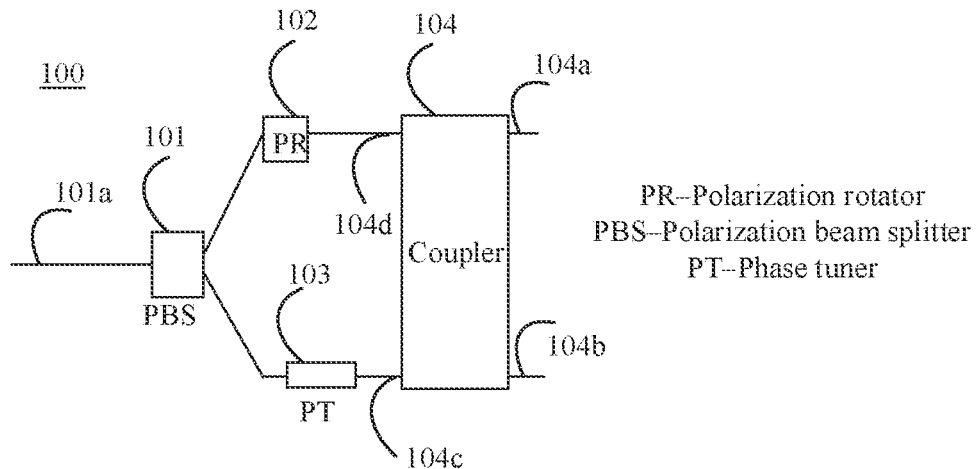
FIG. 1 is a schematic structural diagram of a polarization processing apparatus according to this application.

A device form and a service scenario that are described in the embodiments of this application are intended to describe technical solutions of the embodiments of the present invention more clearly, and do not constitute a limitation on the technical solutions provided in the embodiments of the present invention. A person of ordinary skill in the art may understand that, as the device form evolves and a new service scenario emerges, the technical solutions provided in the embodiments of this application are also applicable to a similar technical problem.

The technical solutions provided in this application are applicable to different service scenarios, including but not limited to a backbone optical transmission network, an optical access network, a data center interconnection, a short-range optical interconnection, wireless service fronthaul/backhaul, and the like. Specifically, the technical solutions provided in this application may be applied to transmit-side devices and/or receive-side devices corresponding to the foregoing different networks.

It should be noted that the terms such as "first" and "second" in this application are intended to distinguish between similar objects but do not necessarily indicate a specific order. It should be understood that the terms used in such a way are interchangeable in proper circumstances so that the embodiments described herein can be implemented in other orders than the order described in this application. "and/or" is used to describe an association relationship between associated objects, and indicates that three relationships may exist. For example, A and/or B may represent the following cases: Only A exists, both A and B exist, and only B exists. A specific operation method in the method embodiment may also be applied to the apparatus embodiment.

It should be further noted that, unless otherwise specified, specific description of some technical features in an embodiment may also be used to explain corresponding technical features mentioned in another embodiment. For example, description of a location and a connection relationship of a photodetector (PD) in an embodiment may be applied to a corresponding PD in another embodiment. For another example, a specific implementation of an optical modulator in an embodiment may be applied to an optical modulator in another embodiment. In addition, to more clearly reflect a relationship between components in different embodiments, same or similar reference numerals are used in this application to indicate components with same or similar functions in different embodiments.

The optical modulator is configured to load an electrical signal onto an optical energy, and output an optical energy (also referred to as an optical signal) with a signal Specifically, a phase, amplitude, and the like of the optical energy onto which the electrical signal is loaded may vary with a specific form of the optical energy. Currently, all optical modulators are polarization sensitive devices. Therefore, the optical modulator needs to be connected to a light source by using a polarization maintaining optical fiber, to ensure that an optical energy input to the optical modulator is in a single polarization state. However, the polarization maintaining optical fiber is expensive, causing high costs of the entire solution.

Therefore, this application provides a polarization processing apparatus. The apparatus may convert an optical energy in a random polarization state into an optical energy in a single polarization state and implement a fixed proportion of beam splitting of optical power. According to the apparatus, an optical transmitter and/or receiver may connect a light source and an optical modulator by using a conventional optical fiber, so that costs of the transmitter and/or the receiver are greatly reduced.

FIG. 1 shows a polarization processing apparatus according to this application. The apparatus 100 includes a polarization beam splitter (PBS) 101, a polarization rotator (PR) 102, a phase tuner (PT) 103, and a coupler 104. One (numbered 101a in FIG. 1) of three ports of the PBS is an input port, and two of four ports of the coupler are output ports (numbered 104a and 104b in FIG. 1). The port 101a is configured to input a continuous optical energy, and the optical energy is in a random mixed polarization state. The ports 104a and 104b are configured to output a single-polarization optical energy. It should be noted that the port 104b is optional. If only the port 104a exists, the apparatus 100 provides one optical energy output port.

The other two of the three ports of the PBS are connected to the PR 102 and one port (for example, a port 104c in the figure) of the coupler through a one-to-one correspondence. It should be noted that the connection through a one-to-one correspondence means that one connection is formed between one port and another port. For example, that the other two of the three ports of the PBS are connected to the PR 102 and one port of the coupler through a one-to-one correspondence means that one connection is formed between one port of the PBS and one port of the PR and another connection is formed between another port of the PBS and one port of the coupler. Therefore, a total of two connections are formed. The PR 102 is connected to another port (for example, a port 104d in the figure) of the coupler 104. It should be noted that the connection described in this paragraph is a direct connection. Specifically, the direction connection may be made by using a waveguide.

The PT 103 shown in FIG. 1 is disposed on a connection between the PBS 101 and the coupler 104. Alternatively, the PT 103 may be disposed on a connection between the PR 102 and the coupler 104. Optical energies output from the two locations are in a same polarization state. Therefore, placing the PT 103 on either of the two locations can relatively simply control a phase of an optical energy passing through the apparatus. It can be learned by a person skilled in the art that the PT 103 may be alternatively placed on a connection between the PBS 101 and the PR 102. This is not limited in this application. Specifically, the PT 103 may be a thermal electrode disposed on a waveguide connection. A voltage of the thermal electrode is adjusted to affect a temperature of a waveguide to change a phase of light in the waveguide.

The PBS 101 is configured to: perform polarization state separation on the input optical energy in the mixed polarization state, and output two single-polarization-state optical energies. It should be noted that, because power of an optical energy in each polarization state in the input optical energy in the mixed polarization state is uncertain, power of the single-polarization-state optical energy output from the PBS is also random.

The PR 102 is configured to perform polarization state conversion on the input single-polarization-state optical energy. Specifically, the PR may convert an optical energy in a transverse magnetic (TM) mode into an optical energy in a TE mode, or convert an optical energy in a TE mode into an optical energy in a TM mode.

The PT 103 is configured to control a phase of an optical energy passing through the component so that optical power of two optical energies output from the coupler is equal. It should be noted that the PT is sometimes also referred to as a phase shifter (PS). To simplify the following description, the term PT is used subsequently. In addition, in this application, equal optical power not only includes strictly equal optical power but also may include approximately equal optical power. For example, a difference between optical power of two optical energies is 5% or falls within a deviation range (for example, 10%) that an optical communications system can withstand. It should be further noted that, that optical power of output optical energies of two output ports of the coupler is equal may also mean that optical power output by each port is half of peak power. The peak power is a sum of a maximum power value and a minimum power value that can be output by one port of the coupler.

It should be noted that the coupler in this application may be a multimode interferometer (MMI) or a directional coupler. In addition, an optical energy output by the apparatus 100 is in a single polarization mode, which may be specifically the TE mode or the TM mode. The current optical device usually uses the TE mode. However, with development of technologies, the optical device may also use an optical energy in the TM mode. This is not limited in this application.

The following further describes the embodiments of this application in detail with reference to more accompanying drawings and based on the foregoing common aspects related to the polarization processing apparatus. It should be noted that the polarization processing apparatus shown in FIG. 1 is also an optical device. Specifically, the apparatus may be a photonic Integrated Circuit (PIC), for example, a silicon photonic integrated chip, a gallium arsenide integrated chip, an indium phosphide integrated chip, or a lithium niobate integrated chip. With development of a PIC technology, the optical device provided in this embodiment of this application may be alternatively a PIC of a new material. This is not limited in this application.

Figure 2:
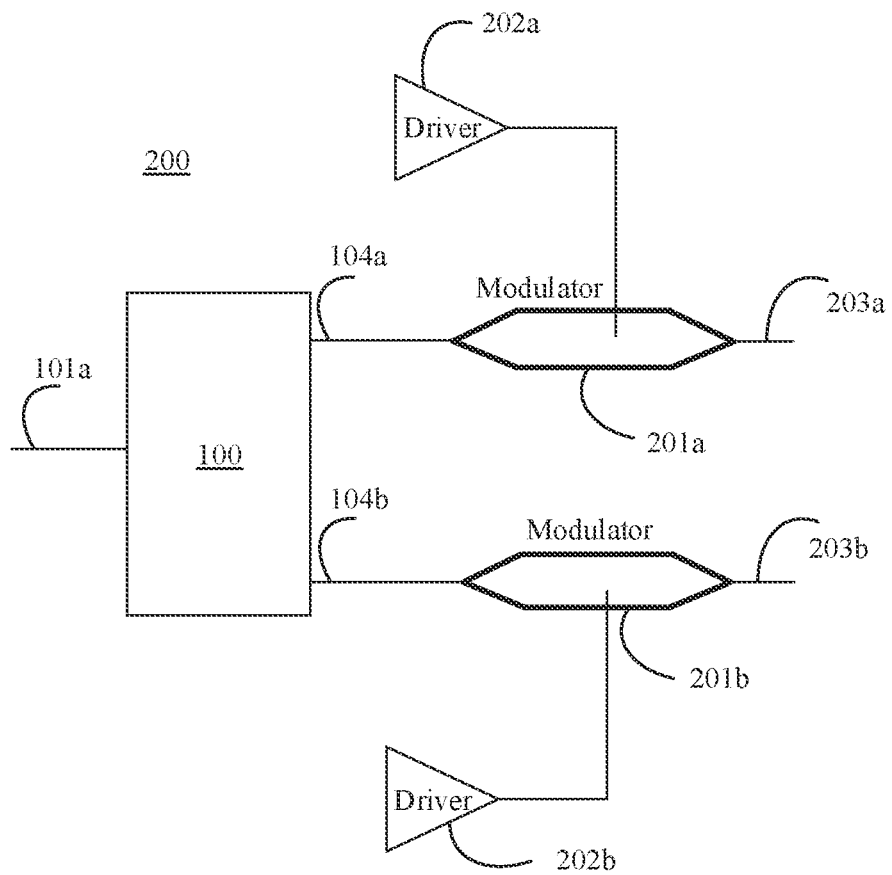
FIG. 2 is a schematic structural diagram of a dual-channel polarization processing optical device according to an embodiment of this application.

FIG. 2 is a schematic structural diagram of a dual-channel polarization processing optical device according to an embodiment of this application. The optical device 200 includes a polarization processing apparatus 100, two modulators (201a and 201b), and two drivers (202a and 202b). For description of the polarization processing apparatus 100, refer to related description of FIG. 1. Details are not described herein again. Connection relationships between the components of the optical device 200 are as follows:

The two modulators are connected to two output ports of the polarization processing apparatus 100 through a one-to-one correspondence, in other words, the two modulators are connected to two ports 104a and 104b of the coupler 104 shown in FIG. 1. Specifically, as shown in FIG. 2, the modulator 201a is connected to the port 104a, and the modulator 201b is connected to the port 104b. The modulator 201a can have a port 203a. The modulator 201b can have a port 203b.

The two drivers are connected to the two modulators through a one-to-one correspondence. Specifically, as shown in FIG. 2, the driver 202a is connected to the modulator 201a, and the driver 202b is connected to the modulator 201b. It should be noted that a person skilled in the art can learn that a connection between the driver and the modulator is an electrical connection. The driver is configured to load a radio frequency electrical signal onto the modulator.

Each of the two modulators includes one optical signal output port. Therefore, the optical device in this embodiment provides dual-channel optical signal output. It should be noted that the modulator mentioned in this embodiment of this application may be any one of a Mach-Zehnder modulator (MZM), an electro-absorption modulator (EAM), and a microring modulator (MRM).

Figure 3A:
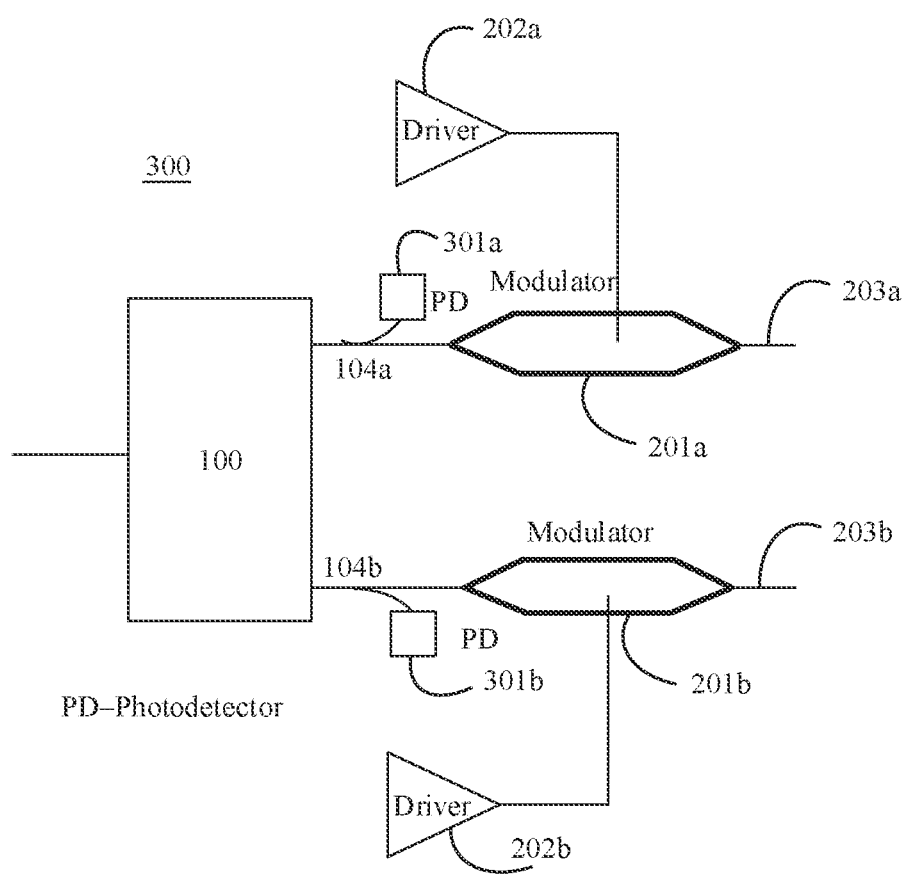
FIG. 3a is a schematic diagram of a possible photodetector connection relationship of the optical device shown in FIG. 2.
Figure 3B:
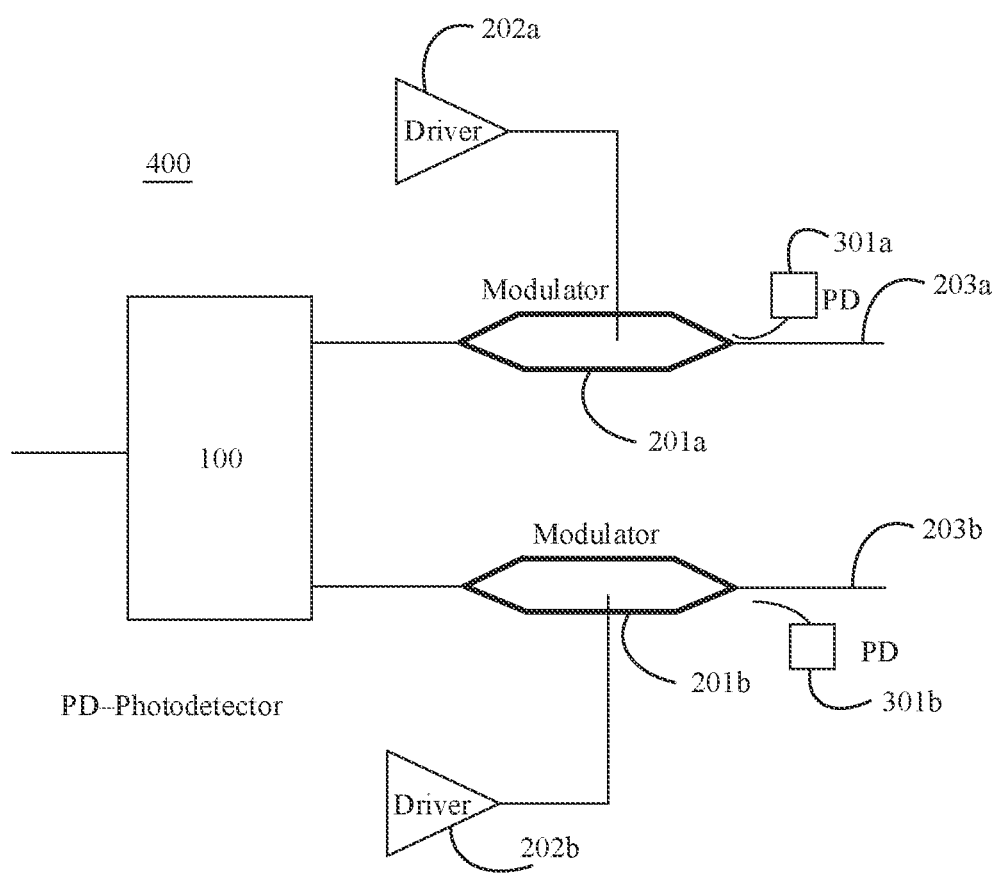
FIG. 3b is a schematic diagram of another photodetector connection relationship of the optical device shown in FIG. 2.
Figure 3C:
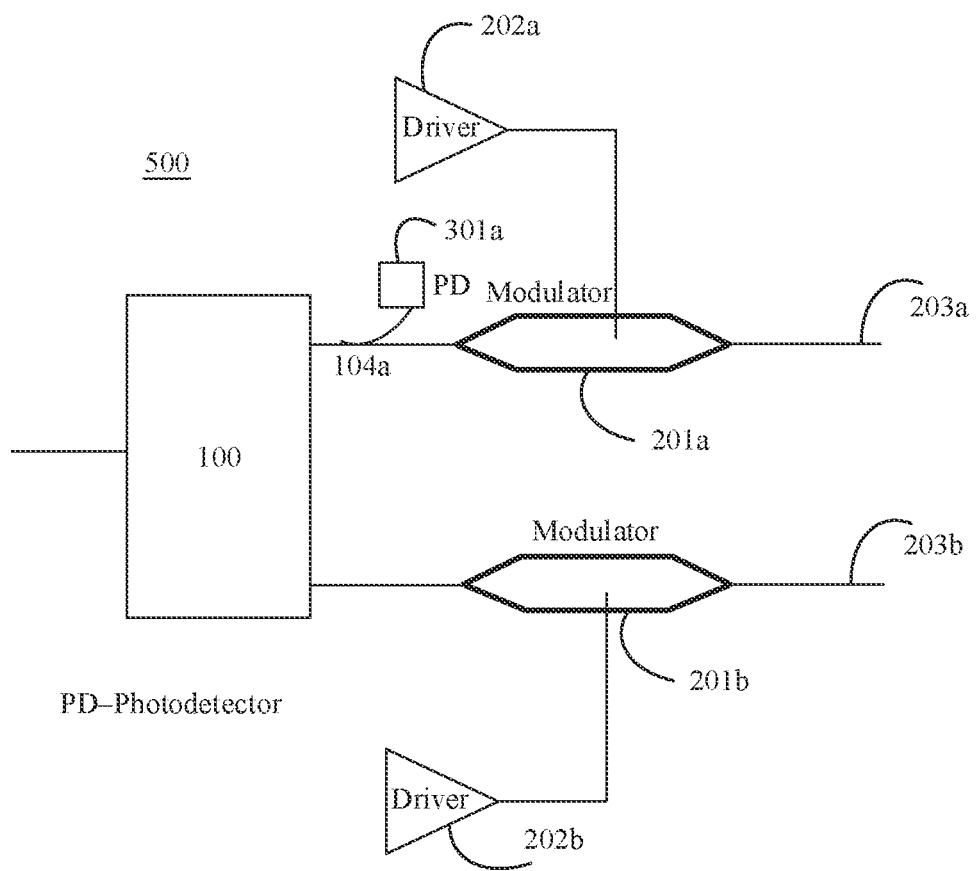
FIG. 3c is a schematic diagram of still another photodetector connection relationship of the optical device shown in FIG. 2.

Optionally, the optical device shown in FIG. 2 may further include a PD, configured to implement optical power detection of a connection corresponding to the PD. FIG. 3a to FIG. 3c are schematic diagrams of three possible PD connection relationships of the optical device shown in FIG. 2.

As shown in FIG. 3a, compared with the optical device 200 shown in FIG. 2, an optical device 300 further includes a PD 301a and a PD 301b. The two PDs are connected to the two ports 104a and 104b of the coupler 104 and the two modulators through a one-to-one correspondence. Specifically, the PD 301a is connected to a connection between the port 104a of the coupler and the modulator 201a, and the PD 301b is connected to a connection between the port 104b of the coupler and the modulator 201b. The PD and a waveguide may be specifically connected by using an optical splitter.

It should be noted that the PD does not necessarily need to be integrated with another component of the optical device 300 into one PIC. Optionally, the optical device 300 may further provide one optical power detection port. Optical power detection is implemented through an external connection to the PD. An advantage of integrating the PD may be that a system structure is more compact and a smaller space and location are occupied.

An optical device 400 shown in FIG. 3b is similar to the structure shown in FIG. 3a, and a main difference lies in different locations of two PDs. In FIG. 3b, the PD 301a and the PD 301b are respectively connected to output ports of the modulator 201a and the modulator 201b. A main difference between an optical device 500 shown in FIG. 3c and the structure in FIG. 3a is that the optical device 500 includes only one PD 301a. Specifically, in the example of FIG. 3c, the PD 301a is connected to a connection between the port 104a of the coupler and the modulator 201a. In specific implementation, the PD 301a may be alternatively connected to a connection between the port 104b of the coupler and the modulator 201b, or similar to FIG. 3b, the PD 301a is connected to either of output ports of the modulator 201a and the modulator 201b. Using only one PD to complete optical power detection simplifies optical device design.

To implement control over a PT in the optical device, the optical device described in this embodiment of this application may be connected to a controller. Specifically, the controller is connected to the PD, and is configured to obtain optical power information output by the PD. Specifically, the optical power information may be a voltage or a current. In addition, the controller is further connected to the PT, and is configured to control a phase of the PT based on the obtained optical power information output by the PD.

Figure 4:
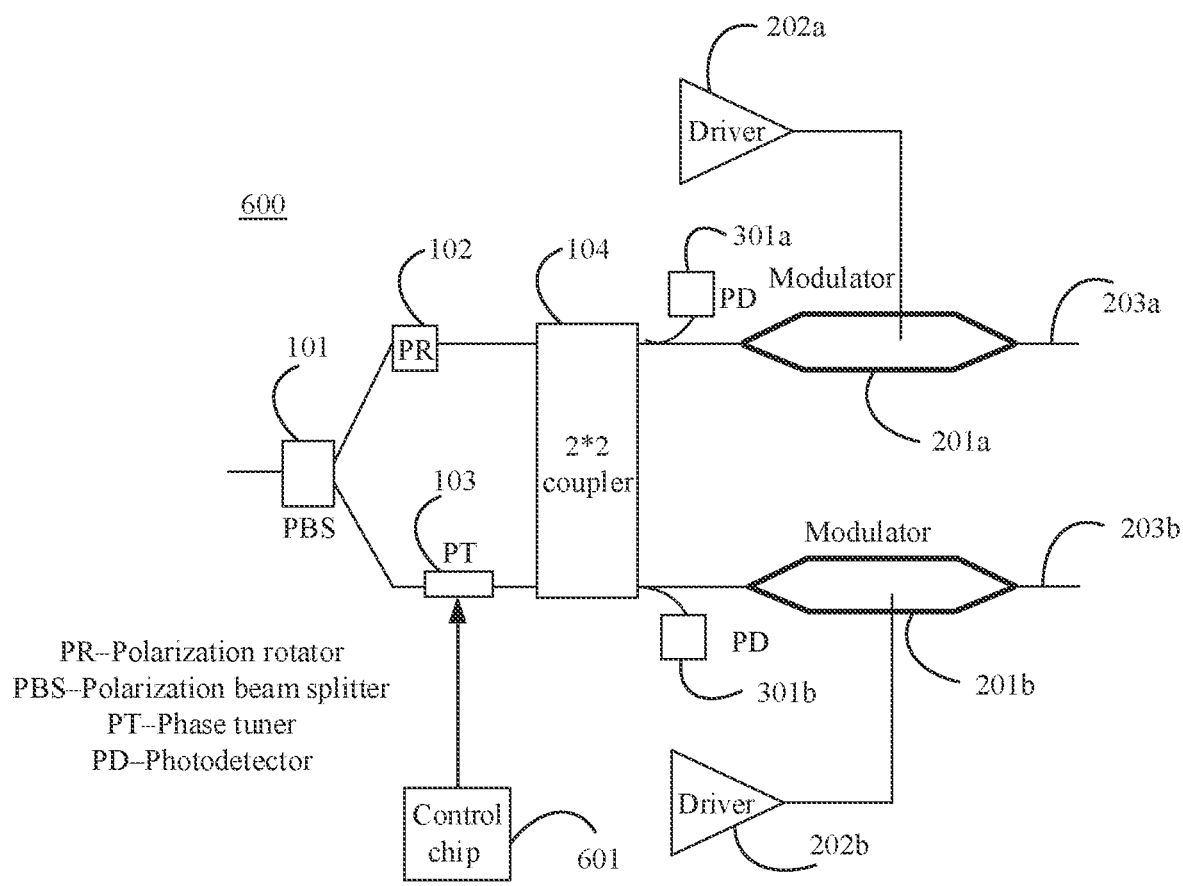
FIG. 4 is a schematic structural diagram of a possible polarization processing system according to an embodiment of this application.

FIG. 4 is a schematic structural diagram of a possible polarization processing system according to an embodiment of this application. It should be noted that the polarization processing system may also be referred to as a polarization processing apparatus. Specifically, the system 600 includes a PBS 101, a PR 102, a PT 103, a coupler 104, two modulators (201a and 201b), two drivers (202a and 202b), two PDs (301a and 301b), and a control chip 601. Connection relationships between system components other than the control chip 601 are the same as those in FIG. 3a, and details are not described herein again. In the system 600, the control chip 601 is directly or indirectly connected to the two PDs (not shown in FIG. 4), so that optical power detected by the two PDs can be provided to the control chip. For example, the controller may be directly connected to the PD through an electrical connection to obtain a current value output by the PD. For another example, the controller may be indirectly connected to the PD by using an intermediate component such as a resistor or an operational amplifier, to obtain a voltage value converted by the intermediate component. In addition, the control chip 601 further needs to be connected to the PT, to adjust a phase of the PT 103. It should be noted that the control chip 601 may also be referred to as a controller.

The following further describes a process of controlling the PT 103 by the control chip 601. Assuming that information values of the PD 301a and the PD 301b that are received by the control chip 601 are P1 and P2, the control chip 601 compares the two values, and if the two values are inconsistent, sends control information to the PT to change the phase of the PT. A specific phase change value needs to be set with reference to a specific actual device. This is not limited in this application. It should be noted that the controller may alternatively set a determining condition of whether a difference between P1 and P2 is less than a preset threshold T, to determine whether the phase of the PT needs to be changed. In other words, if the difference between the two is less than T, no phase adjustment needs to be performed; otherwise, the controller needs to adjust the current phase of the PT.

Optionally, an optical device in the system shown in FIG. 4 may be replaced with that shown in FIG. 3c, in other words, the optical device includes only one PD. In this case, the control chip may also implement phase control over the PT by using power information of the PD. Specifically, the control chip may obtain peak power of the PD by adjusting the phase of the PT, and then continuously adjust the phase of the PT until power of the PD becomes half of the peak power. In this case, the phase value of the PT can ensure that output power of two output ports of the coupler 104 is equal or has a relatively small deviation. It should be noted that "half of the peak power" is not a strict requirement. It can be learned by a person skilled in the art that, in actual application, there may be a specific error between the power of the PD and half of the peak power due to a limitation of factors such as control precision.

According to the optical devices shown in FIG. 2 to FIG. 4, dual-channel single-polarization optical signal output can be implemented. The optical device may use a light source in a random polarization state as input, in other words, a corresponding system may use a common optical fiber, so that system costs are reduced. It should be noted that the common optical fiber is a relatively cheap optical fiber, and may also be referred to as a conventional optical fiber. When light is transmitted in the common optical fiber, a polarization state of the light changes randomly. For example, an optical fiber specified in the ITU-T G652 standard is a common optical fiber. "cheap" is described relative to an expensive polarization maintaining optical fiber. Specifically, the conventional optical fiber may be a conventional single-mode optical fiber.

Figure 5:
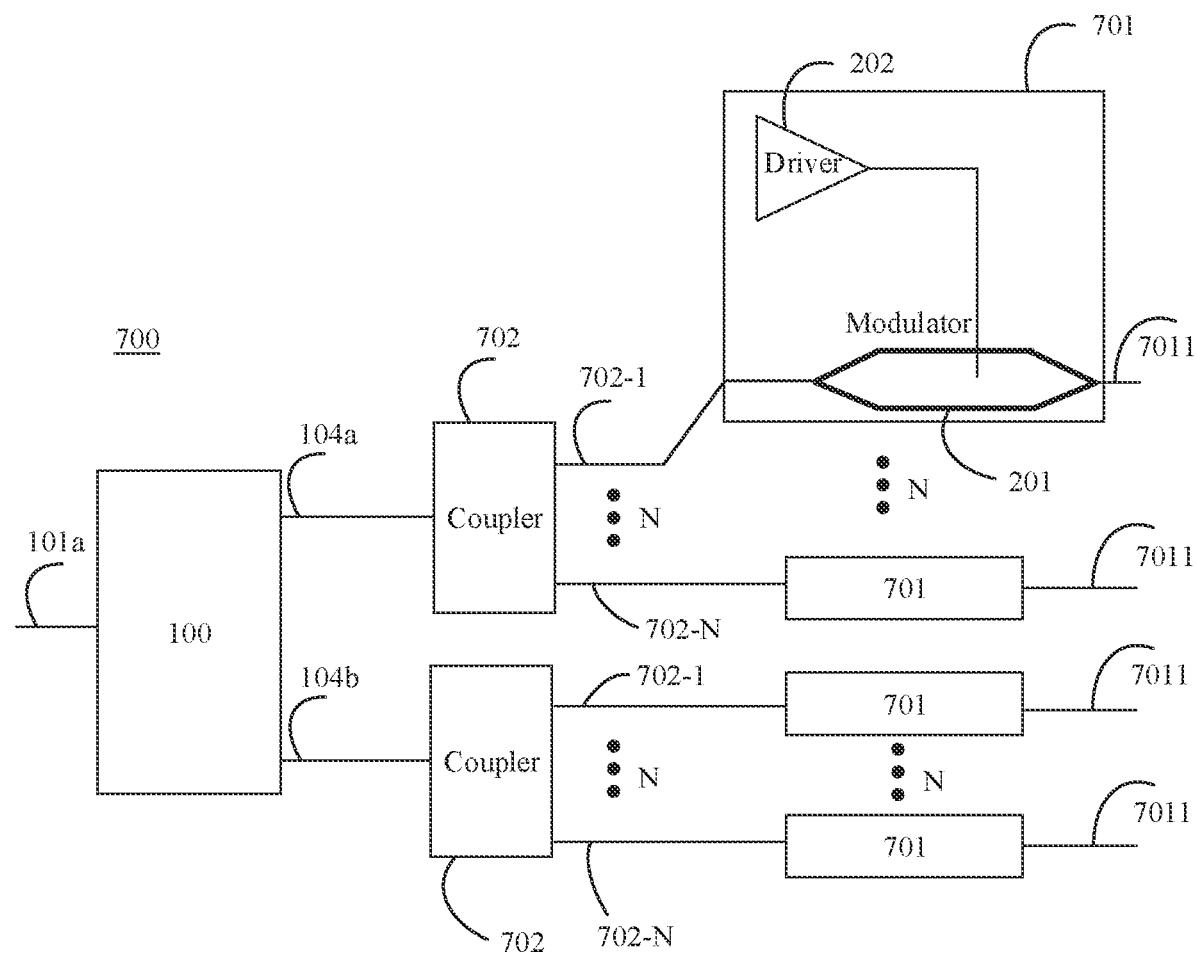
FIG. 5 is a schematic structural diagram of a multi-channel polarization processing optical device according to an embodiment of this application.
Figure 6A:
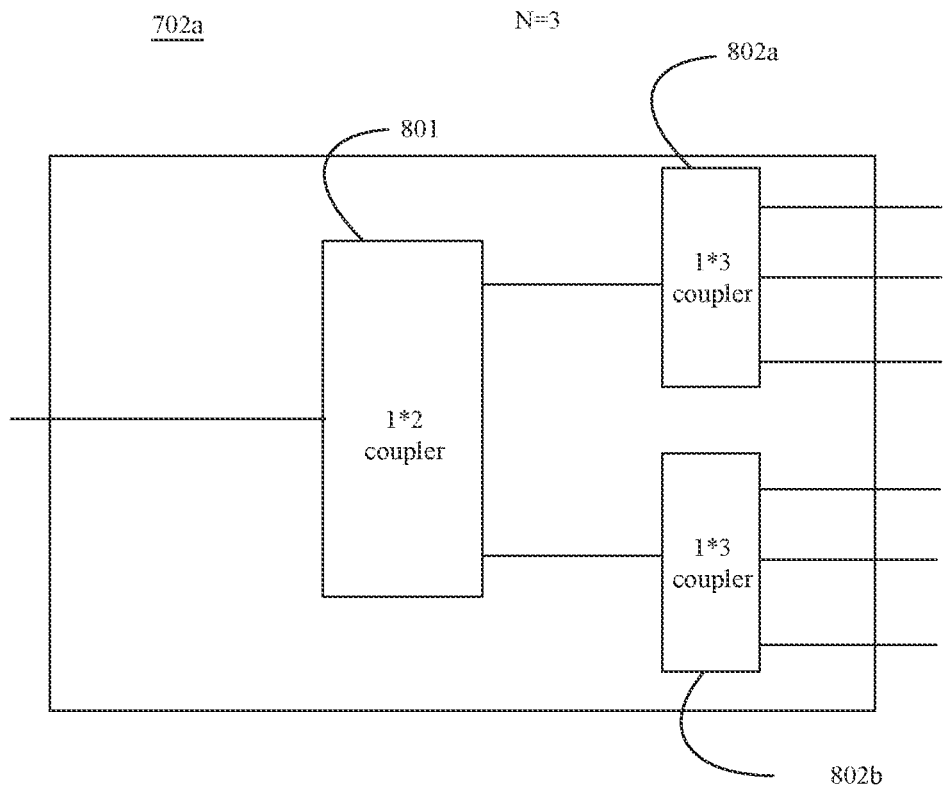
FIG. 6a is a possible schematic structural diagram of a coupler 702 included in the optical device shown in FIG. 5.
Figure 6B:
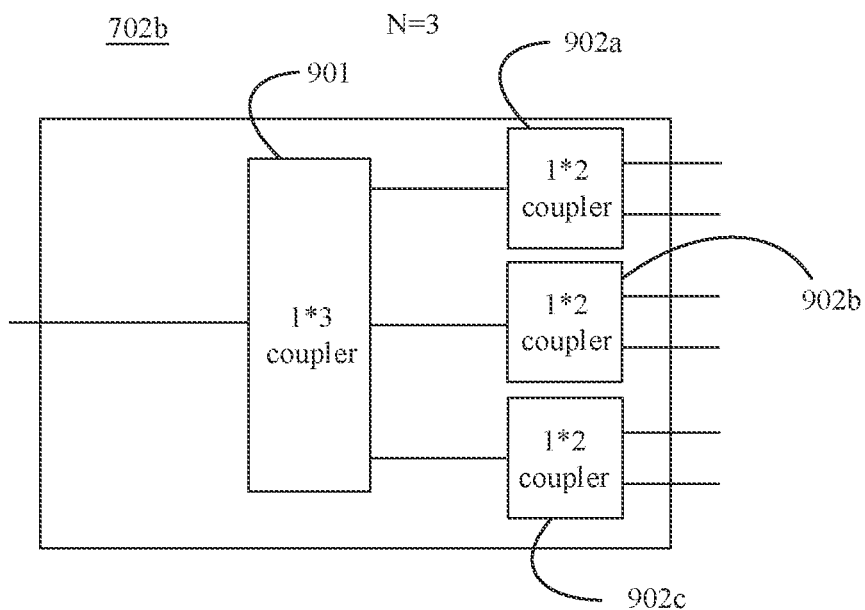
FIG. 6b is another possible schematic structural diagram of the coupler 702 included in the optical device shown in FIG. 5.
Figure 6C:
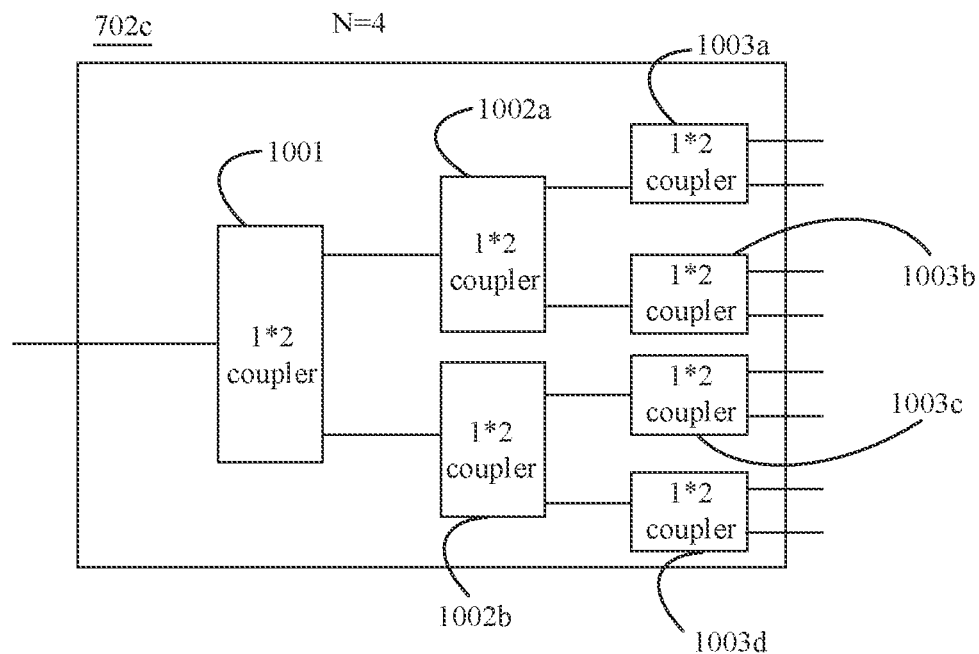
FIG. 6c is still another possible schematic structural diagram of the coupler 702 included in the optical device shown in FIG. 5.

FIG. 5 is a schematic structural diagram of a multi-channel polarization processing optical device according to an embodiment of this application. "multi-channel" herein means that the optical device can provide four or more channels. The optical device 700 includes a polarization processing apparatus 100, two couplers 702, 2N modulators 201, and 2N drivers 202. For description of the polarization processing apparatus 100, refer to related description of FIG. 1. Details are not described herein again. For simplification of description, in FIG. 5, one modulator 201 and one driver 202 are considered as one component and numbered 701, and a port 7011 is an optical signal output port provided by the modulator 201. In other words, the optical device 700 provides 2N optical signal output ports, where N is greater than or equal to 2. It can be learned from FIG. 5 that the optical device 700 includes 2N components 701, where N components in the 2N components are connected to a coupler connected to a port 104a (in other words, connected to a port 702-1, . . . , and 702-N), and the other N couplers are connected to a coupler connected to a port 104b. It should be noted that the two couplers included in the optical device 700 have a same structure, and therefore are not distinguished by using different reference numerals. In addition, the coupler in this embodiment may be a single coupler, or may be a composite coupler obtained by cascading a plurality of couplers. In a possible implementation, the coupler 702 is a single 1*2 coupler, that is, N=2, and the optical device 700 can implement four-channel optical signal output. FIG. 6a to FIG. 6c are schematic structural diagrams of three composite couplers. To reflect differences between different structures, the coupler 702 is numbered 702a, 702b, and 702c in FIG. 6a to FIG. 6c respectively.

FIG. 6a and FIG. 6b are schematic structural diagrams of a six-channel (that is, N=3) coupler 702. In FIG. 6a, the coupler 702a includes one 1*2 coupler 801 and two 1*3 couplers (802a and 802b), so that a 1*6 composite coupler is obtained. The two 1*3 couplers are connected to two ports of the 1*2 coupler through a one-to-one correspondence. In FIG. 6b, the coupler 702b includes one 1*3 coupler 901 and three 1*2 couplers (902a, 902b, and 902c), so that a 1*6 composite coupler is obtained. The three 1*2 couplers are connected to three ports of the 1*3 coupler through a one-to-one correspondence. It can be learned from the two figures that a same composite coupler may be obtained in different manners. A structure of a specific 1*N composite coupler is not limited in this application.

In FIG. 6c, the coupler 702c is a 1*8 coupler, and is obtained by cascading three levels of couplers. Specifically, the coupler includes seven 1*2 couplers (1001, 1002a, 1002b, and 1003a to 1003d). The couplers 1002a and 1002b are connected to two ports of the coupler 1001 through a one-to-one correspondence. The couplers 1003a to 1003d are connected to four ports of the couplers 1002a and 1002b through a one-to-one correspondence. Similarly, one 1*K coupler may be obtained by using (K−1) 1*2 couplers, where K is an even number.

It should be noted that FIG. 6a to FIG. 6c show only examples of a quantity of channels that can be supported by the optical device 700. In specific implementation, a quantity of supported channels may be designed based on an actual requirement.

Optionally, the optical device 700 in this embodiment may further include a PD. A specific quantity of PDs and a specific location of the PD are similar to those in FIG. 3a to FIG. 3c, and details are not described herein again. In addition, in this embodiment, the PD may be further placed on a connection between the coupler 702 and the component 701, or PDs may be placed on output ports of a pair of couplers in a composite coupler. It should be noted that, if the optical device 700 includes two PDs, locations of the two PDs are corresponding. For example, if one coupler is placed on one output port of the coupler 1002a in FIG. 6c, the other PD is placed on one output port of the coupler 1002b.

Optionally, the optical device 700 in this embodiment may also implement control over a PT through interaction with a control chip. For details, refer to related description of FIG. 4. Details are not described herein again.

According to the optical device provided in this embodiment, multi-channel single-polarization optical signal output can be implemented. The optical device may use a light source in a random polarization state as input, in other words, a corresponding system may use a common optical fiber, so that system costs are reduced. In addition, using a coupler structure to implement multi-channel output can support system application of more channels.

Figure 7A:
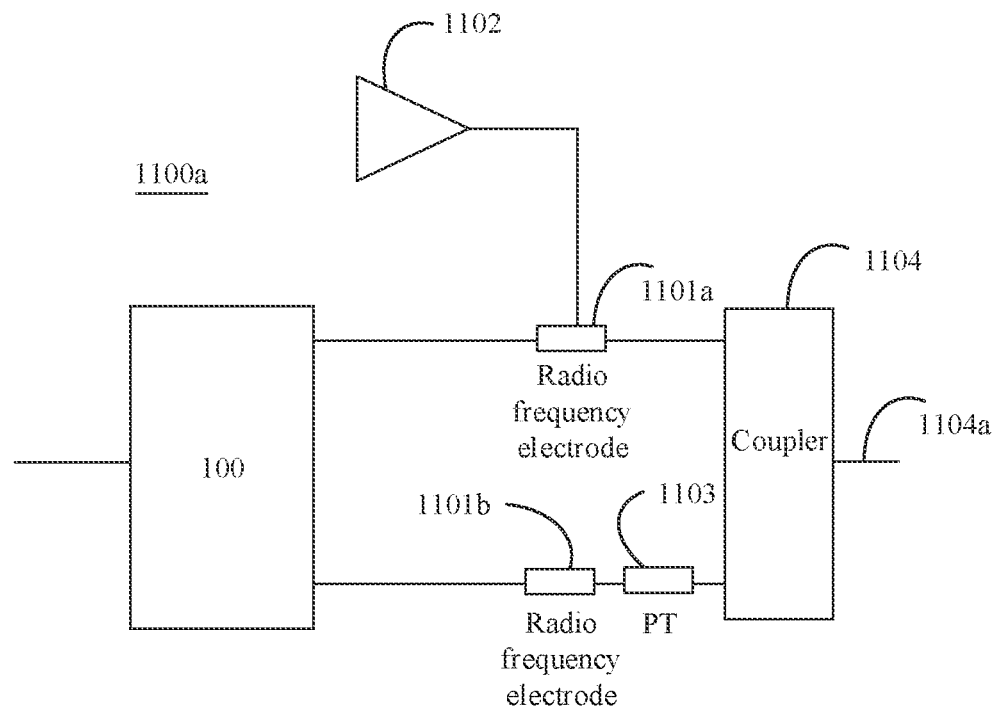
FIG. 7a is a schematic structural diagram of a possible single-channel polarization processing optical device according to an embodiment of this application.
Figure 7B:
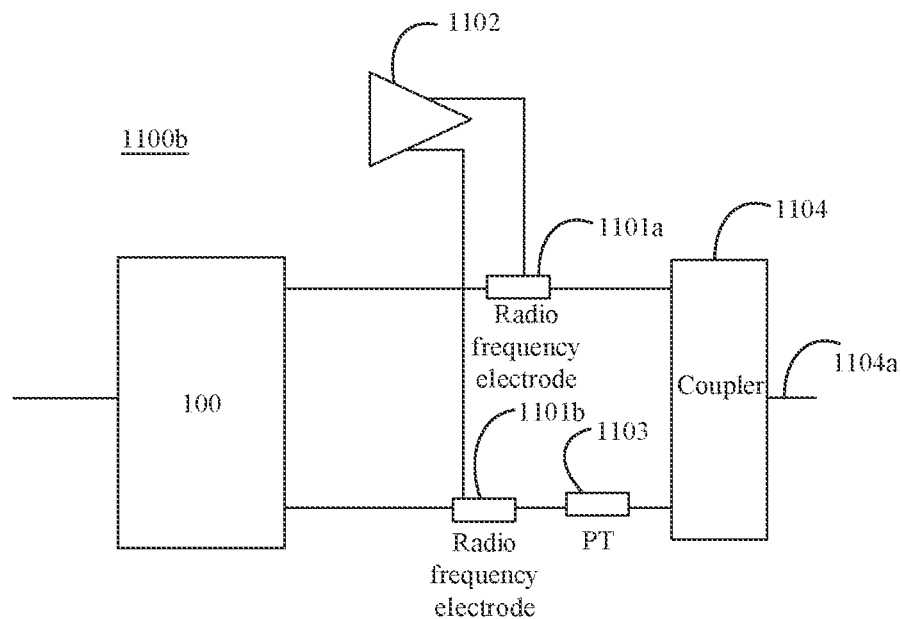
FIG. 7b is a schematic structural diagram of another possible single-channel polarization processing optical device according to an embodiment of this application.

FIG. 7a and FIG. 7b are schematic structural diagrams of two possible single-channel polarization processing optical devices according to an embodiment of this application. An optical device 1100a shown in FIG. 7a includes a polarization processing apparatus 100, two radio frequency electrodes (1101a and 1101b), a PT 1103, a coupler 1104, and a driver 1102. For description of the polarization processing apparatus 100, refer to related description of FIG. 1. Details are not described herein again. Two ports of the coupler 1104 are connected to the polarization processing apparatus 100 (to be specific, two ports 104a and 104b of the coupler 104), to obtain two connections. The PT 1103 may be disposed on either of the two connections. One location example is shown in FIG. 7a. The PT 1103 is configured to control a phase of light passing through the component, so that there is a preset proportion of optical signal output optical power of the coupler 1104 to peak power of the coupler 1104. For example, the preset proportion is half of the peak power. In actual application, a value of the preset proportion depends on specific component design. Similar to the PT 1103, the radio frequency electrode may be placed on at least one of the two connections. In other words, there may be one or two radio frequency electrodes. Two radio frequency electrodes are shown in FIG. 7a, and are respectively placed on the two connections. The driver 1102 is configured to drive the radio frequency electrode 1101*a*. It should be noted that the driver 1102 may also drive the radio frequency electrode 1101*b*. The coupler 1104 can have a port 1104*a*.

It should be noted that one MZM includes a coupler 104, the coupler 1104, and intermediate components (namely, the PT 1103 and the radio frequency electrodes 1101*a* and 1101*b*). The PT 1103 is configured to adjust the MZM, so that the MZM reaches a working point, in other words, quality of an optical signal output through modulation is optimal.

An optical device 1100*b* shown in FIG. 7*b* has basically same components and connection relationships as the optical device in FIG. 7*a*, and a main difference lies in that a driver 1102 in the optical device 1100*b* is connected to two radio frequency electrodes, to implement differential driving on an MZM. Differential driving means simultaneously driving a single modulator by using two electrical signals with same amplitude and opposite phases.

Optionally, the optical devices 1100*a* and 1100*b* in this embodiment may further include a PD. A specific quantity of PDs and a specific location of the PD are similar to those in FIG. 3*a* to FIG. 3*c*, and details are not described herein again. It should be noted that if two PDs are included, the two PDs may be placed in the MZM. Preferably, the two PDs are respectively placed on the left side and the right side of the radio frequency electrodes, to improve detection accuracy. This is not limited in this application.

Optionally, the optical devices 1100*a* and 1100*b* in this embodiment may also implement control over a PT through interaction with a control chip. For details, refer to related description of FIG. 4. Details are not described herein again. It should be noted that in this embodiment, the control chip needs to implement control over two PTs, namely, a PT in the polarization processing apparatus 100 and the PT 1103.

Specifically, the coupler 1104 in FIG. 7*a* and FIG. 7*b* may be a 2*1 coupler to implement single-channel output. The 2*1 coupler is easy to process, and an insertion loss of the device is relatively small. Alternatively, the coupler may be a 2*2 coupler. One of two output ports is configured to output an optical signal, and the other channel may be connected to the PD, to detect whether the MZM reaches a working point. An advantage of using the 2*2 coupler is that the 2*2 coupler can provide a separate port for detection. It should be noted that, if optical power detection needs to be performed when the 2*1 coupler is used, optical splitting detection may be performed from an output port by using an optical splitter.

According to the optical devices shown in FIG. 7*a* and FIG. 7*b*, single-channel single-polarization optical signal output can be implemented. The optical device may use a light source in a random polanzation state as input, in other words, a corresponding system may use a common optical fiber, so that system costs are reduced. In addition, through ingenious structure design, single-channel output can be supported, which is more applicable to a long-distance transmission scenario.

Figure 8:
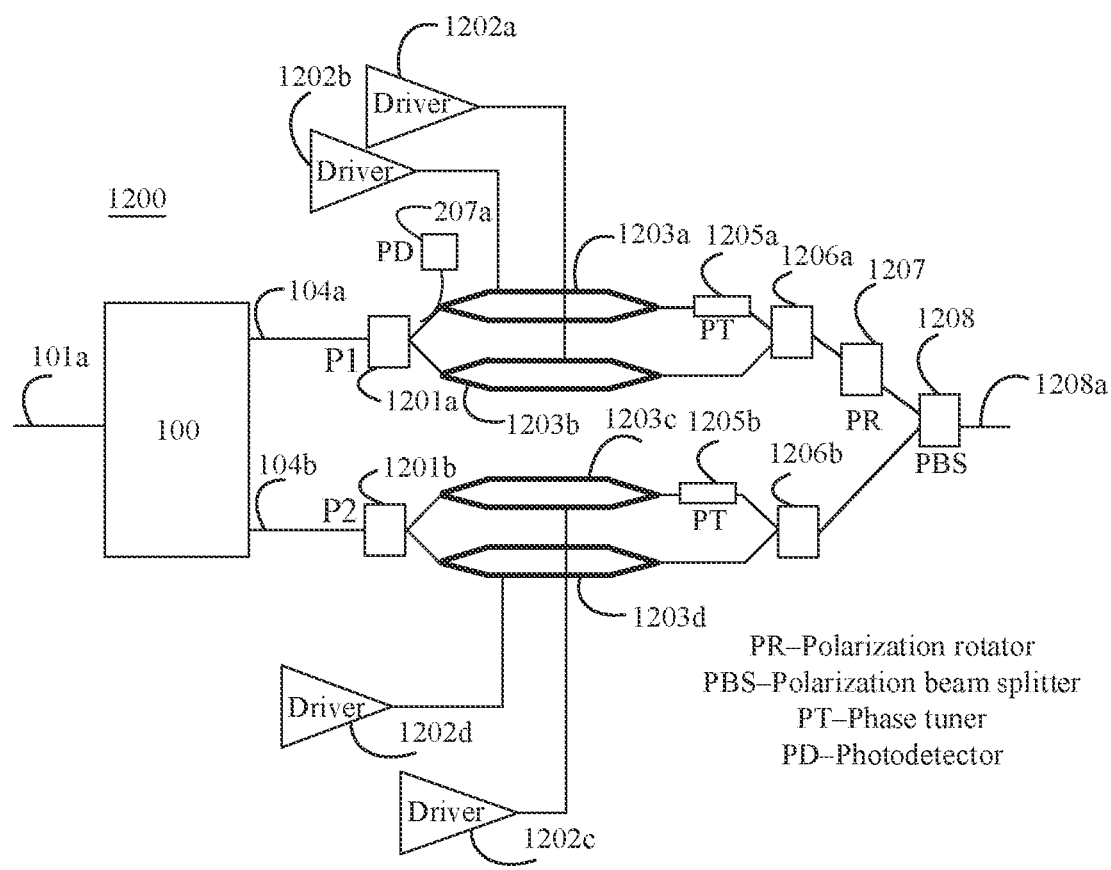
FIG. 8 is a schematic structural diagram of a possible coherent output polarization processing optical device according to an embodiment of this application.

FIG. 8 is a schematic structural diagram of a possible coherent output polarization processing optical device according to an embodiment of this application. Specifically, an optical device 1200 includes a polarization processing apparatus 100, four couplers (1201*a*, 1201*b*. 1206*a*, and 1206*b*), four modulators 1203*a* to 1203*d*, four drivers (1202*a* to 1202*d*), two PTs (1205*a* and 1205*b*), another PR 1207, another PBS 1208, and a PD 207*a*. For description of the polarization processing apparatus 100, refer to related description of FIG. 1. Details are not described herein again. Connection relationships between these components are as follows:

The coupler 1201*a* and the coupler 1201*b* are connected to two output ports 104*a* and 104*b* of the polarization processing apparatus 100 through a one-to-one correspondence. Two output ports of the coupler 1201*a* are connected to two modulators (1203*a* and 1203*b*) through a one-to-one correspondence. Similarly, two output ports of the coupler 1201*b* are connected to two modulators (1203*c* and 1203*d*) through a one-to-one correspondence. The four drivers 1202*a* to 1202*d* respectively drive the four modulators (1203*a* to 1203*d*). The modulators 1203*a* and 1203*b* are both connected to the coupler 1206*a*, to obtain two connections. The PT 1205*a* may be disposed on either of the two connections. Similarly, the modulators 1203*c* and 1203*d* are both connected to the coupler 1206*b*, to obtain two other connections. The PT 1205*b* may be disposed on either of the other two connections. The two PTs are configured to adjust a working point of each modulator to ensure better signal output quality.

The coupler 1205*a* is connected to the PR 1207. The PR 1207 is connected to the PBS 1208. The coupler 1206*b* is connected to the PBS 1208. The PBS 1208 provides one optical signal output port. Alternatively, the coupler 1205*a* may be connected to the PBS 1208, and the coupler 1206*b*, the PR 1207, and the PBS 1208 are successively connected. The PBS 1208 can have a port 1208*a*.

The PD 207*a* is connected to a connection between the coupler 1201*a* and the modulator 1203*a*. Alternatively, the optical device 1200 may be designed according to FIG. 3*a* to FIG. 3*c*, in other words, the optical device 1200 includes two PDs, or the PD is disposed on another location. For details, refer to description of FIG. 3*a* to FIG. 3*c*. Details are not described herein again.

The four drivers jointly output a quadrature phase shift keying (QPSK) or 16 quadrature amplitude modulation (QAM) electrical signal, and load the electrical signal onto the four modulators, to implement final coherent QPSK or 16QAM optical signal output.

According to the optical device provided in this embodiment, coherent single-polarization optical signal output can be implemented. The optical device may use a light source in a random polarization state as input, in other words, a corresponding system may use a common optical fiber, so that system costs are reduced. In addition, structure design is suitable, so that a related optical transmission scenario can be supported.

Figure 9:
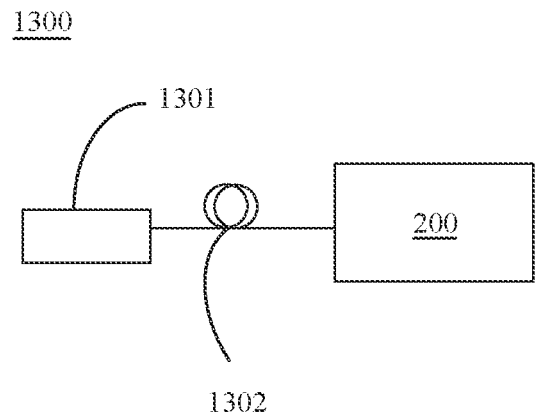
FIG. 9 is a schematic structural diagram of a possible optical transmitting system according to an embodiment of this application.

FIG. 9 is a schematic diagram of a possible optical transmitting system according to an embodiment of this application. It should be noted that the optical transmitting system may also be referred to as an optical transmitter. A system 1300 includes a light source 1301, an optical fiber 1302, and an optical device 200. For the optical device 200 and a variation of the optical device 200, refer to related description of FIG. 2. Details are not described herein again. The light source 1301 is configured to output a continuous optical energy. The optical fiber 1302 is configured to connect the light source 1301 and the optical device 200, so that an optical energy can enter the optical device 200.

It should be noted that the optical device 200 in FIG. 9 may be replaced with an optical device in another embodiment, for example, the optical device 600 shown in FIG. 4, the optical device 700 shown in FIG. 5, the optical device 1100*a* or 1100*b* shown in FIG. 7*a* and FIG. 7*b*, or the optical device 1200 shown in FIG. 8, so that specific requirements of different application scenarios are met.

Figure 10:
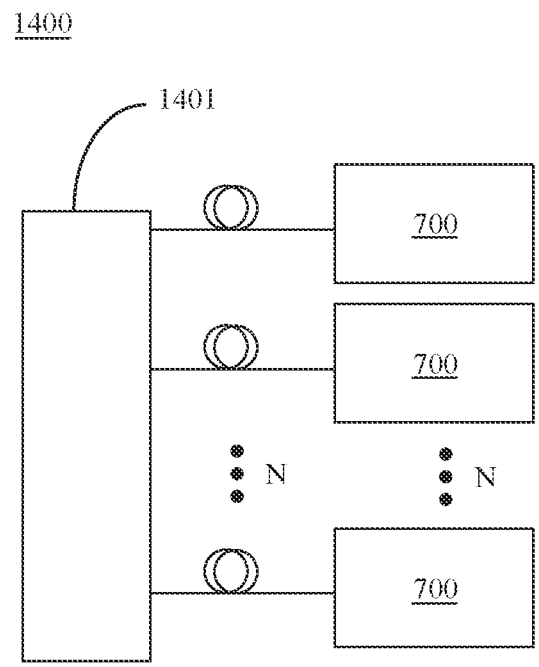
FIG. 10 is a schematic structural diagram of another possible optical transmitting system according to an embodiment of this application.

FIG. 10 is a schematic diagram of another possible optical transmitting system according to an embodiment of this application. It should be noted that the another optical transmitting system may also be referred to as an optical transmitter. A system 1400 includes a light source pool 1401, N optical fibers (not numbered), and an optical device 700. For the optical device 700 and a variation of the optical device 700, refer to related description of FIG. 5. Details are not described herein again. The light source pool 1401 includes N light sources, in other words, can output N continuous optical energies. The N light sources are connected to the N optical fibers through a one-to-one correspondence, to input the N optical energies to N optical devices, so that the optical energies are modulated, and N optical signals are output. N is greater than or equal to 2.

It should be noted that the optical device 700 in FIG. 10 may be replaced with an optical device in another embodiment, for example, the optical device 600 shown in FIG. 4, the optical device 200 shown in FIG. 2, the optical device 1100a or 1100b shown in FIG. 7a and FIG. 7b, or the optical device 1200 shown in FIG. 8, so that specific requirements of different application scenarios are met.

In specific application, output ports of the systems shown in FIG. 9 and FIG. 10 may be directly connected to an optical fiber, to output an optical signal. Alternatively, the systems shown in FIG. 9 and FIG. 10 may be first connected to a wavelength division multiplexer to implement multiplexing and then is connected to an optical fiber for output. This is not limited in this application.

It should be further noted that the optical fiber in FIG. 9 and FIG. 10 may be a conventional optical fiber, so that costs of the entire solutions of the systems are relatively low. However, the optical fiber may be alternatively a polarization maintaining optical fiber. A type of an optical fiber used in actual application is not limited in this application.

Figure 11:
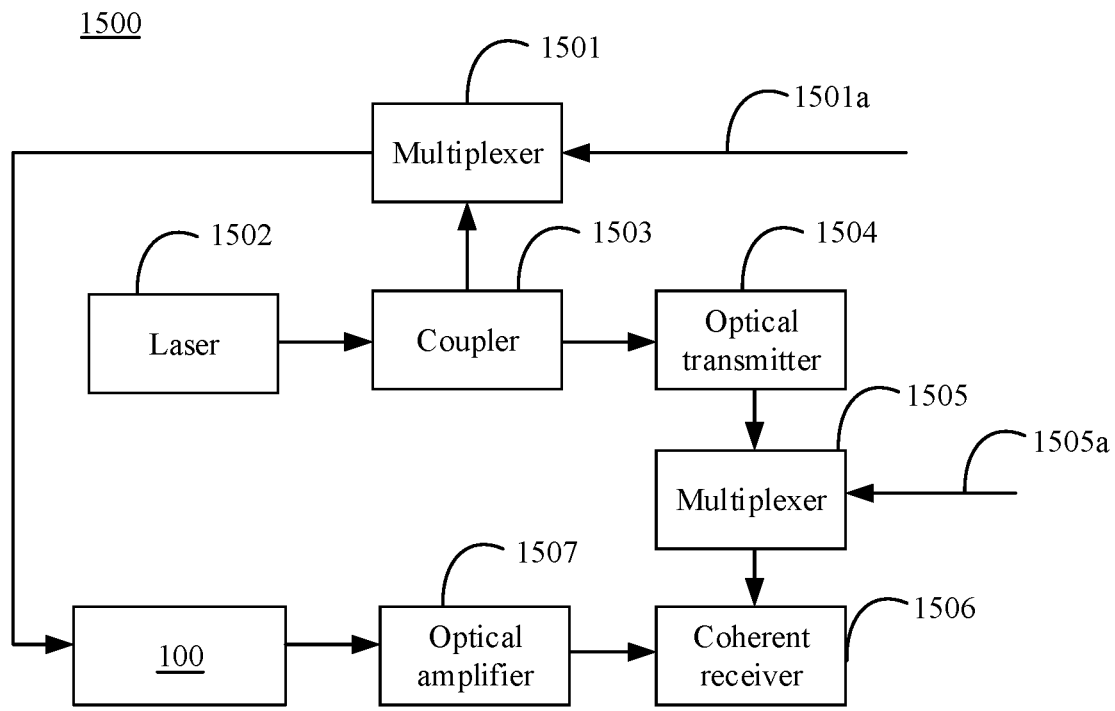
FIG. 11 is a schematic structural diagram of a possible optical receiving system according to an embodiment of this application.

FIG. 11 is a schematic diagram of a possible optical receiving system according to an embodiment of this application. The system is used in a coherent optical communications network. In this network, a device does not generate local oscillator light, but receives local oscillator light sent from a transmitting end device. A polarization state of local oscillator light may change after the local oscillator light is transmitted through an optical fiber, but a coherent receiver can receive only local oscillator light in a single polarization state. Therefore, a polarization processing apparatus disclosed in this application needs to be used. A system 1500 includes a polarization processing apparatus 100, two multiplexers (1501 and 1505), a laser 1502, a coupler 1503, an optical transmitter 1504, an optical amplifier 1507, and a coherent receiver 1506. For the polarization processing apparatus 100, refer to related description of FIG. 1. Details are not described herein again. Alternatively, the optical device may be replaced with a structure 1600 shown in FIG. 12 (in other words, the polarization processing apparatus 100 is connected to one coupler 1601 and one PT 1602, where the PT 1602 is configured to control output optical power of the coupler 1601), or the polarization processing apparatus 100 includes only one output port (for example, includes only a port 104a). It should be noted that if the polarization processing apparatus 100 shown in FIG. 1 is used, the system 1500 uses only one output port of the polarization processing apparatus 100. Compared with the structure in FIG. 12, the polarization processing apparatus 100 shown in FIG. 1 is simpler to control (only one PT needs to be controlled).

Connection relationships between the components of the system 1500 are as follows:

The laser 1502 is connected to the coupler 1503, and two ports of the coupler are respectively connected to the multiplexer 1501 and the optical transmitter 1504. The coupler 1503 is configured to divide an optical energy of the laser 1502 into two parts, where one part is to be input to the multiplexer 1501, and the other part is to be input to the optical transmitter 1504. A port 1501a of the multiplexer 1501 is configured to receive local oscillator light sent by another device, and is further configured to send locally generated local oscillator light (namely, an optical energy generated by the laser 1502) to a peer device (not shown in FIG. 11). The multiplexer 1501 is configured to transmit the received local oscillator light to the polarization processing apparatus 100 for polarization processing. The optical transmitter 1504 is connected to the multiplexer 1505. A port 1505a of the multiplexer 1505 is configured to receive an optical signal sent by the peer device. The multiplexer 1505 is further configured to send an optical signal generated by the optical transmitter 1504 to the peer device (not shown in FIG. 11). The polarization processing apparatus 100 processes an input optical energy into single-polarization light. The optical amplifier 1507 is configured to amplify an optical energy output from the optical device 1100a. It should be noted that the optical amplifier 1507 is an optional component. Without this component, a single-polarization-state light source output from the polarization processing apparatus 100 can directly enter the coherent receiver. The coherent receiver is configured to: receive local oscillator light obtained through polarization processing and an optical signal sent by the peer device, and process the local oscillator light and the optical signal, to obtain a client signal transmitted by the peer device.

It should be noted that a device including the system 1500 is connected to another device in the same network by using an optical fiber. Specifically, bidirectional optical energy transmission may be implemented by using a single optical fiber. In this case, wavelengths sent by both ends are different. Alternatively, bidirectional transmission may be implemented by using two optical fibers. In this case, whether wavelengths are the same or different is not limited.

Figure 12:
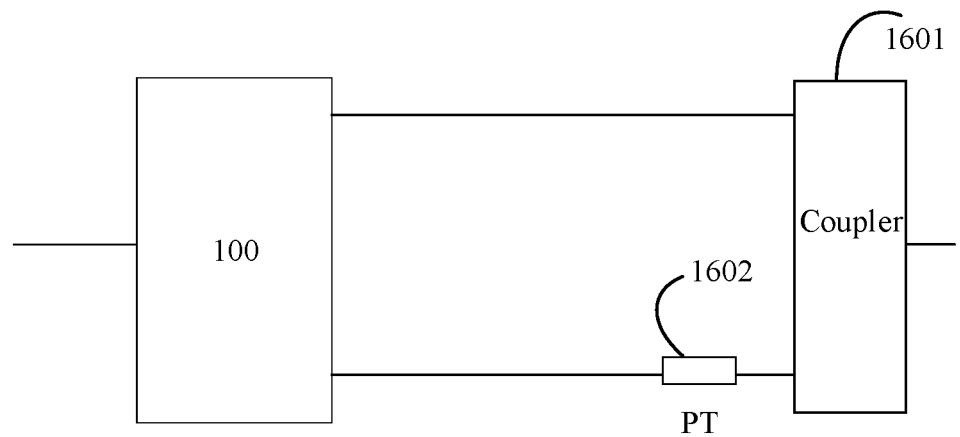
FIG. 12 is a schematic structural diagram of a possible variation of a polarization processing apparatus 100 in the system shown in FIG. 11.

It should be further noted that the structure shown in FIG. 12 is similar to the structure shown in FIG. 7a, and a difference lies in that the structure shown in FIG. 12 does not perform signal modulation (in other words, does not include a modulator and a radio frequency electrode component). Therefore, description of other components in FIG. 7a is applicable to FIG. 12, and details are not described herein again.

In the system shown in FIG. 11, the optical device disclosed in this application is used, so that received polarized light can be processed without a relatively expensive optical fiber, thereby reducing system costs.

Figure 13:
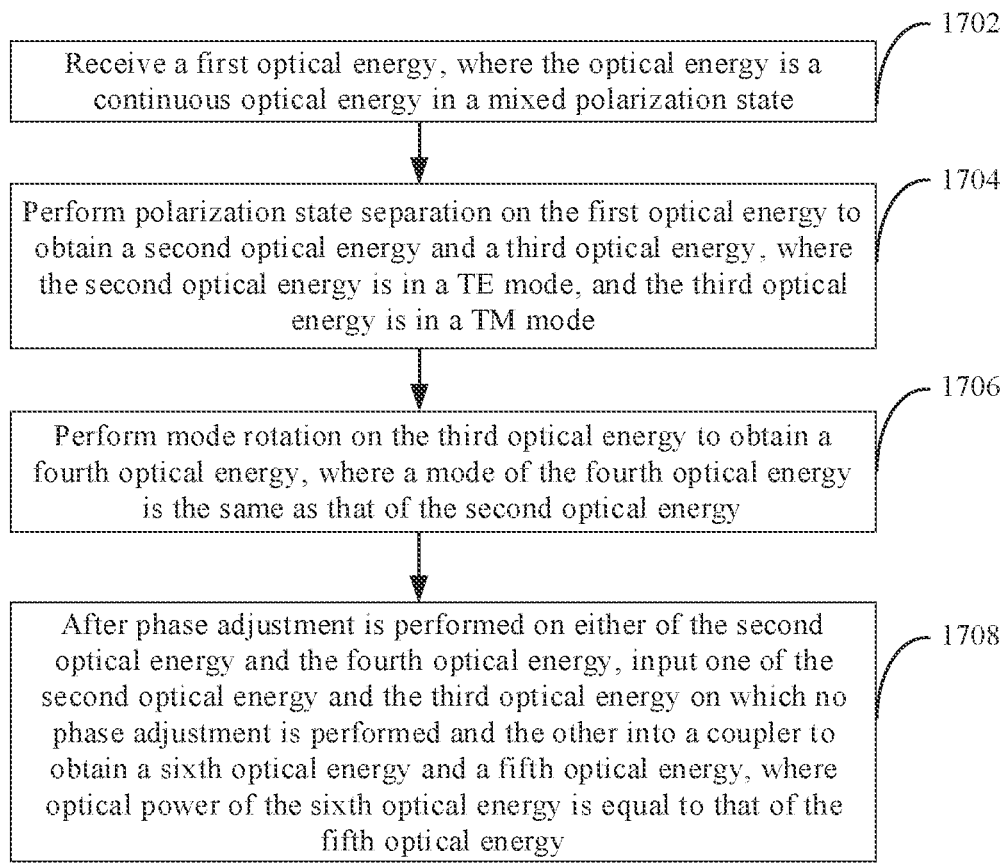
FIG. 13 shows a polarization processing method according to an embodiment of this application.

FIG. 13 shows a polarization processing method according to an embodiment of this application. Specifically, the method includes the following steps:

Step 1702: Receive a first optical energy, where the optical energy is a continuous optical energy in a mixed polarization state.

Step 1704: Perform polarization state separation on the first optical energy to obtain a second optical energy and a third optical energy, where the second optical energy is in a TE mode, and the third optical energy is in a TM mode.

Step 1706: Perform mode rotation on the third optical energy to obtain a fourth optical energy, where a mode of the fourth optical energy is the same as that of the second optical energy.

Step 1708: After phase adjustment is performed on either of the second optical energy and the fourth optical energy, input one of the second optical energy and the fourth optical energy on which no phase adjustment is performed and the other into a coupler to implement multimode interference, to obtain a sixth optical energy and a fifth optical energy, where optical power of the sixth optical energy is equal to that of the fifth optical energy.

It should be noted that the phase adjustment may be performed one or more times. Specifically, a specific value of the phase adjustment may be determined by detecting one or both of the sixth optical energy and the fifth optical energy. It should be further noted that for a meaning of the concept of "equal", reference is made to description in the foregoing related embodiments.

In addition, in specific application, the mode of the second optical energy and the mode of the third optical energy may be transposed, so that an optical energy only in the TM mode is finally output in the foregoing method steps.

Optionally, in a specific application scenario, the sixth optical energy and the fifth optical energy further need to be further processed to obtain a finally output optical signal. For example, signal modulation may be separately performed on the sixth optical energy and the fifth optical energy to implement multi-channel optical signal output. For another example, the sixth optical energy and the fifth optical energy may be further divided into 2N optical energies (where N is greater than or equal to 2), and then signal modulation is performed to implement optical signal output of four or more channels. For still another example, combination and signal modulation may be performed on the sixth optical signal and the fifth optical signal to implement single-channel optical signal output. For further use and related processing of the optical energy, refer to the foregoing apparatus embodiments. Details are not described herein again.

Through processing in the foregoing method, a mixed-polarization optical energy may be processed into two single-polarization-state optical energies with equal power or approximately equal power. This method may be applied to a scenario in which a single-polarization-state optical energy is required, and no polarization maintaining optical fiber needs to be used, so that system costs are effectively reduced.

It should be further noted that the controller or the control chip mentioned in this application may be a processor, or a system including a processor and a memory. Specifically, the processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transceiver, wherein the transceiver comprises a laser, a second coupler, a first multiplexer, an optical transmitter, a second multiplexer, a polarization processing optical device and a coherent receiver, wherein:

the laser is connected to the second coupler;

two ports of the second coupler are respectively connected to the first multiplexer and the optical transmitter;

the optical transmitter is connected to the second multiplexer;

the first multiplexer is connected to the polarization processing optical device, wherein the first multiplexer is configured to receive a local oscillator light sent by a peer device and to send a part of a laser light emitted by the laser to the peer device, the polarization processing optical device is configured to process the local oscillator light output by the first multiplexer, and the second multiplexer is connected to the coherent receiver, wherein the second multiplexer is configured to receive an optical signal sent by the peer device, and send an optical signal generated by the optical transmitter to the peer device;

the coherent receiver is configured to receive processed local oscillator light obtained through the polarization processing optical device and the optical signal sent by the peer device; and the polarization processing optical device is connected to the coherent receiver, wherein the polarization processing optical device comprises a polarization beam splitter (PBS), a polarization rotator (PR), a first coupler, and a first phase tuner (PT), wherein:

the PBS comprises three ports, one of the three ports of the PBS is connected to the first multiplexer, the other two of the three ports of the PBS are respectively connected to a first port of the PR and a first port of the first coupler, and the PR is configured to perform polarization rotation on an optical energy output by the PBS;

a second port of the PR is connected to a second port of the first coupler;

the first PT is disposed on a connection between the PBS and the first coupler, or the first PT is disposed on a connection between the PR and the first coupler; and a third port and a fourth port of the first coupler are configured to output single-polarization light in a same polarization state, and the first PT is configured to control an output optical power of the third port and an output optical power of the fourth port to be equal.

2. The transceiver according to claim 1, wherein the first coupler is a 2*2 coupler.

3. The transceiver according to claim 1, wherein the polarization processing optical device is a photonic integrated chip (PIC), and wherein the PIC is a silicon photonic integrated chip, a gallium arsenide integrated chip, an indium phosphide integrated chip, or a lithium niobate integrated chip.

4. The transceiver according to claim 1, wherein the transceiver further comprises an optical amplifier, and wherein the polarization processing optical device is connected to the coherent receiver by using the optical amplifier.

5. The transceiver according to claim 1, wherein the coherent receiver is configured to process the processed local oscillator light and the optical signal to obtain a client signal transmitted by the peer device.

6. The transceiver according to claim 1, wherein:

the polarization processing optical device further comprises a third coupler and a second PT;

the third port and the fourth port of the first coupler are respectively connected to two ports of the third coupler to obtain two connections;
the second PT is placed on either of the two connections, and the second PT is configured to control a phase of light passing through the second PT; and
the second coupler comprises an optical signal output port.

\* \* \* \* \*